United States Patent
Coenegracht et al.

(10) Patent No.: US 9,632,268 B2
(45) Date of Patent: Apr. 25, 2017

(54) PRESSURE ACTUATED SEALANT ASSEMBLY

(71) Applicant: CommScope Connectivity Belgium BVBA, Kessel-Lo (BE)

(72) Inventors: Philippe Coenegracht, Hasselt (BE); Dirk Jozef G. Van De Weyer, Beringen (BE); Mohamed Aznag, Scherpenheuvel (BE)

(73) Assignee: COMMSCOPE CONNECTIVITY BELGIUM BVBA (BE)

( * ) Notice: Subject to any disclaimer, the term of this patent is extended or adjusted under 35 U.S.C. 154(b) by 0 days.

(21) Appl. No.: 15/181,748

(22) Filed: Jun. 14, 2016

(65) Prior Publication Data

US 2017/0010431 A1    Jan. 12, 2017

Related U.S. Application Data

(63) Continuation of application No. 14/412,377, filed as application No. PCT/EP2013/063497 on Jun. 27, 2013, now Pat. No. 9,400,363.

(Continued)

(51) Int. Cl.
| | | |
|---|---|---|
| *G02B 6/00* | (2006.01) | |
| *G02B 6/44* | (2006.01) | |
| *H02G 15/013* | (2006.01) | |

(52) U.S. Cl.
CPC ......... *G02B 6/4444* (2013.01); *H02G 15/013* (2013.01)

(58) Field of Classification Search
CPC .. G02B 6/4452; G02B 6/3897; G02B 6/4471; G02B 6/4453; G02B 6/4454
See application file for complete search history.

(56) References Cited

U.S. PATENT DOCUMENTS

| 4,572,923 A | 2/1986 | Castellani et al. |
| 5,446,823 A | 8/1995 | Bingham et al. |

(Continued)

FOREIGN PATENT DOCUMENTS

| DE | 30 25 766 | 1/1982 |
| DE | 31 29 489 | 2/1983 |

(Continued)

OTHER PUBLICATIONS

International Search Report for International Application No. PCT/EP2013/063486 mailed Feb. 6, 2014 (6 pages).

(Continued)

*Primary Examiner* — Jennifer Doan
(74) *Attorney, Agent, or Firm* — Merchant & Gould P.C.

(57) ABSTRACT

An enclosure includes a housing and a sealing unit that fits within a sealing unit opening of the housing. The sealing unit provides a seal around cable ports and provides a peripheral seal between the housing and the sealing unit. The sealing unit can include a sealant arrangement and an actuation arrangement for pressurizing the sealant arrangement within the sealing unit opening. The actuation arrangement can include inner and outer pressurization structures between which the sealant arrangement is positioned. The actuation arrangement includes first and second actuators each movable between a non-actuated position and an actuated position. When the first and second actuators are moved towards the actuated positions, the first and second actuators generate first and second seal pressurization forces that press the sealant arrangement between the first and second pressurization structures, and the first and second seal pressurization forces are transferred through respective first and second springs.

18 Claims, 11 Drawing Sheets

Related U.S. Application Data

(60) Provisional application No. 61/667,243, filed on Jul. 2, 2012, provisional application No. 61/667,290, filed on Jul. 2, 2012.

(56) References Cited

U.S. PATENT DOCUMENTS

| | | | |
|---|---|---|---|
| 5,630,419 A * | 5/1997 | Ranalletta | A61B 8/00 439/135 |
| 5,764,844 A | 6/1998 | Mendes | |
| 5,774,618 A | 6/1998 | Jones | |
| 5,775,702 A | 7/1998 | Laeremans et al. | |
| 6,046,406 A | 4/2000 | Milanowski et al. | |
| 6,088,886 A | 7/2000 | Gyöngyösi | |
| 7,038,137 B2 | 5/2006 | Grubish et al. | |
| 8,604,360 B2 | 12/2013 | Knorr et al. | |
| 9,151,413 B2 * | 10/2015 | Marold | B60R 16/0222 |
| 2002/0146229 A1 | 10/2002 | Roberts | |
| 2003/0156798 A1 | 8/2003 | Cull | |
| 2004/0080119 A1 | 4/2004 | Goll | |
| 2004/0100028 A1 | 5/2004 | Desard et al. | |
| 2006/0063418 A1 | 3/2006 | Motzigkeit | |
| 2009/0304341 A1 | 12/2009 | Shimirak et al. | |
| 2009/0309313 A1 | 12/2009 | Knorr et al. | |
| 2013/0014974 A1 | 1/2013 | Burke et al. | |
| 2013/0020771 A1 | 1/2013 | Vanhentenrijk et al. | |
| 2015/0137461 A1 | 5/2015 | Coenegracht et al. | |
| 2015/0155696 A1 | 6/2015 | Coenegracht et al. | |
| 2015/0357809 A1 | 12/2015 | Coenegracht | |

FOREIGN PATENT DOCUMENTS

| | | |
|---|---|---|
| DE | 33 22 809 | 1/1985 |
| DE | 20 2006 006 019 | 7/2006 |
| DE | 20 2011 003 754 | 8/2012 |
| DE | 10 2012 112 510 | 6/2014 |
| EP | 0 442 941 | 1/1995 |
| EP | 0 638 976 | 2/1995 |
| EP | 0 652 619 | 5/1995 |
| EP | 0 587 616 | 7/1996 |
| EP | 0 426 658 | 11/1996 |
| EP | 0 681 598 | 9/1997 |
| EP | 0 841 734 | 5/1998 |
| EP | 1 710 882 | 10/2006 |
| EP | 2 330 706 | 6/2011 |
| WO | WO 95/24756 | 9/1995 |
| WO | WO 96/32660 A1 | 10/1996 |
| WO | WO 96/62660 | 10/1996 |
| WO | WO 97/42693 | 11/1997 |
| WO | WO 99/56370 | 11/1999 |
| WO | WO 01/28057 | 4/2001 |
| WO | WO 02/33796 | 4/2002 |
| WO | WO 02/063736 | 8/2002 |
| WO | WO 02/097488 | 12/2002 |
| WO | WO 2005/027290 | 3/2005 |
| WO | WO 2006/118747 | 11/2006 |
| WO | WO 2007/118548 | 10/2007 |
| WO | WO 2007/137717 | 12/2007 |
| WO | WO 2008/112118 | 9/2008 |
| WO | WO 2009/148604 | 12/2009 |
| WO | WO 2011/067190 | 6/2011 |
| WO | WO 2012/152789 | 11/2012 |
| WO | WO 2014/095462 | 6/2014 |

OTHER PUBLICATIONS

International Search Report for International Application No. PCT/EP2013/063495 mailed Feb. 6, 2014 (5 pages).

International Search Report for International Application No. PCT/EP2013/063500 mailed Feb. 6, 2014 (7 pages).

International Search Report for International Application No. PCT/EP2013/063497 mailed Feb. 6, 2014 (6 pages).

* cited by examiner

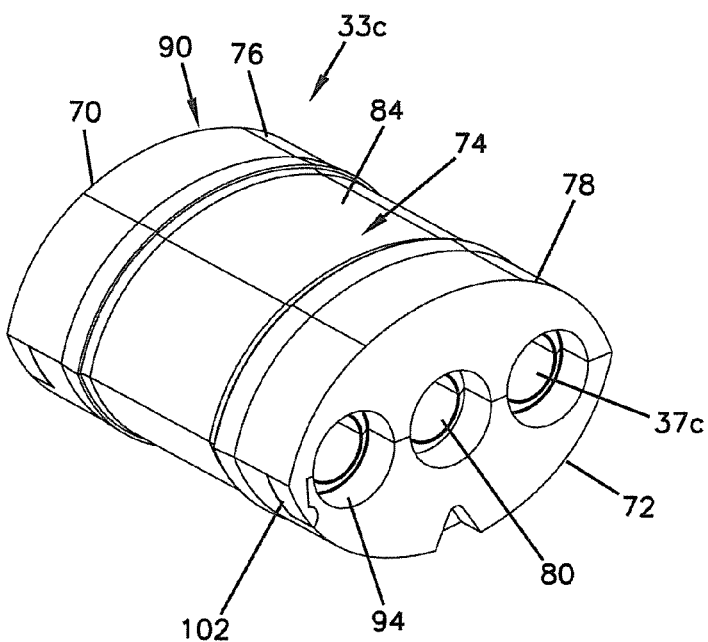
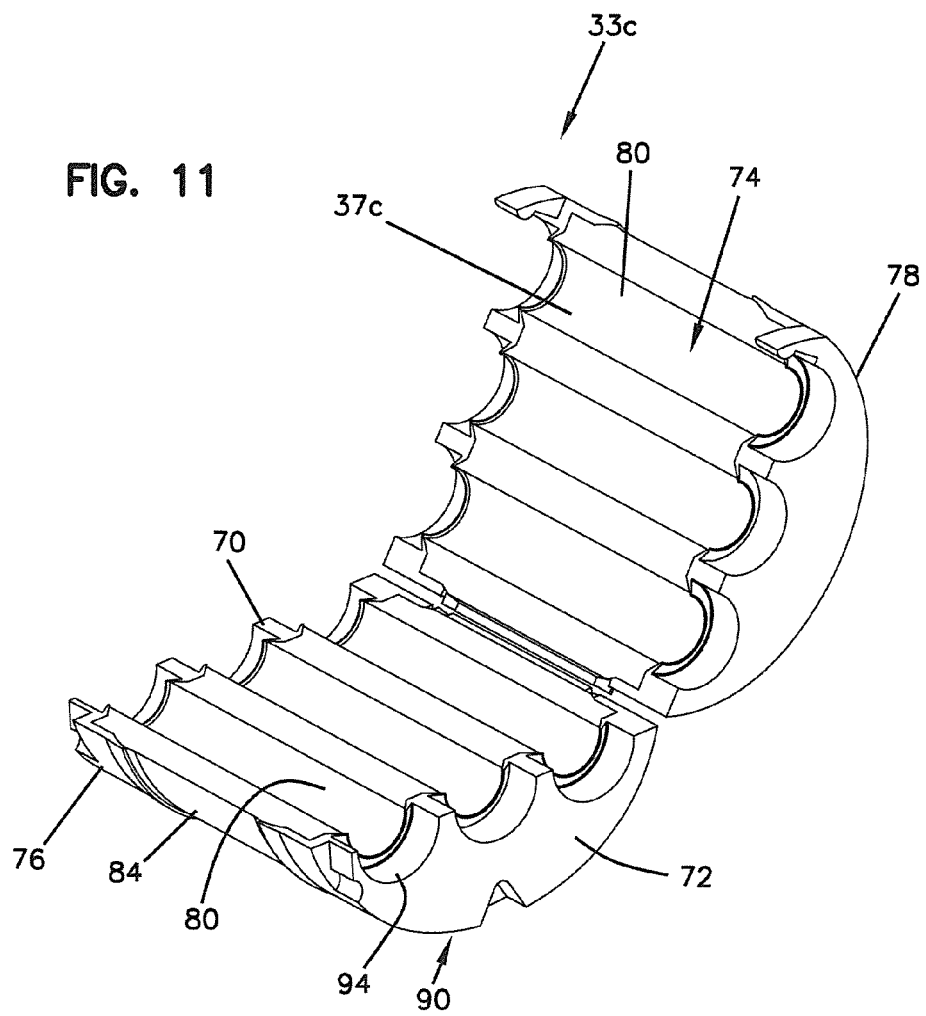

PRESSURE ACTUATED SEALANT ASSEMBLY

CROSS REFERENCE TO RELATED APPLICATIONS

This application is a Continuation of U.S. application Ser. No. 14/412,377, filed on 31 Dec. 2014, now issued as U.S. Pat. No. 9,400,363 on Jul. 26, 2016, which is a National Stage Application of PCT/EP2013/063497, filed 27 Jun. 2013, which claims benefit of U.S. Application No. 61/667,243, filed on 2 Jul. 2012 and 61/667,290, filed on 2 Jul. 2012 and which applications are incorporated herein by reference. To the extent appropriate, a claim of priority is made to each of the above disclosed applications.

TECHNICAL FIELD

The present disclosure relates generally to techniques for sealing cable entry points of enclosures within telecommunications systems.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters and wavelength division multiplexers. It is often preferred for the telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges or other structures. Telecommunications enclosures are typically sealed to inhibit the intrusion of moisture or other contaminants. Pressurized gel-type seals have been used to effectively seal the locations where telecommunications cables enter and exit telecommunications enclosures. Example pressurized gel-type seals are disclosed by document EP 0442941 B1 and document EP 0587616 B1. Both of these documents disclose gel-type cable seals that are pressurized through the use of threaded actuators. Document U.S. Pat. No. 6,046,406 discloses a cable seal that is pressurized through the use of an actuator including a cam lever. While pressurized cable seals have generally proven to be effective, improvements in this area are still needed.

SUMMARY

The present disclosure relates generally to a cable port size reducer adapted to be inserted into a cable port of a cable sealing unit for providing a reduced port size. In certain embodiments, the cable port size reducer can include an insert body in the form of a plug defining one or more reduced sized cable ports. The insert body can include a volume of sealant having an inner cable sealing surface defining the one or more reduced size cable ports and a peripheral sealing surface. In certain embodiments, the cable sealing surface has an axial length that is longer than the peripheral sealing surface. In certain embodiments, the cable port size reducer has an insert body with a composite construction having a volume of sealant at least partially contained between first and second containment layers that form axial end caps of the insert body. In certain embodiments, the cable port size reducer can be inserted within a man cable port of a pressure actuated main sealant assembly, and the volume of sealant of the cable port size reducer is pressurized by the same actuator arrangement used to pressurize the main sealant assembly.

Aspects of the present disclosure allow a pressure actuated sealant assembly to be readily adapted in the field or at the factory so as to accommodate cables of different numbers and sizes. In certain embodiments, the design is cost effective and efficient since the cable port size reducer does not need to use an additional actuator to be pressurized, but instead can be incorporated into an existing sealant arrangement and can be pressurized using the same actuator used to pressurize the existing sealant arrangement. In certain embodiments, the cable port size reducer can have a longer axial cable gel bonding/sealing length inside the cable port size reducer as compared to an axial bonding/sealing length at a periphery of the cable port size reducer. This is advantageous because cables often have scratches or inconsistencies at their outer surfaces caused by manipulation and handling during installation. Thus, the longer gel sealing length at the cable to insert interface helps insure that an adequate seal is provided around the cable. The periphery of the cable port size reducer typically will contact gel of the main sealant assembly and therefore can provide an adequate seal with a shorter gel sealing length than the length of gel sealing surface required to insure an adequate seal about a cable. By varying the lengths of the inside and outside sealing surfaces of the cable port reducing insert, the overall amount of sealant utilized in the insert can be conserved and insert can have a compact, cost effective design.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventions and inventive concepts upon which the embodiments disclosed herein are based.

BRIEF DESCRIPTION OF THE DRAWINGS

FIG. 9 is a perspective view of a cable port size reducing insert in accordance with the principles of the present disclosure shown in a closed position;

FIG. 11 shows the cable port size reducing insert of FIG. 9 in an open position.

DETAILED DESCRIPTION

Figure 1:
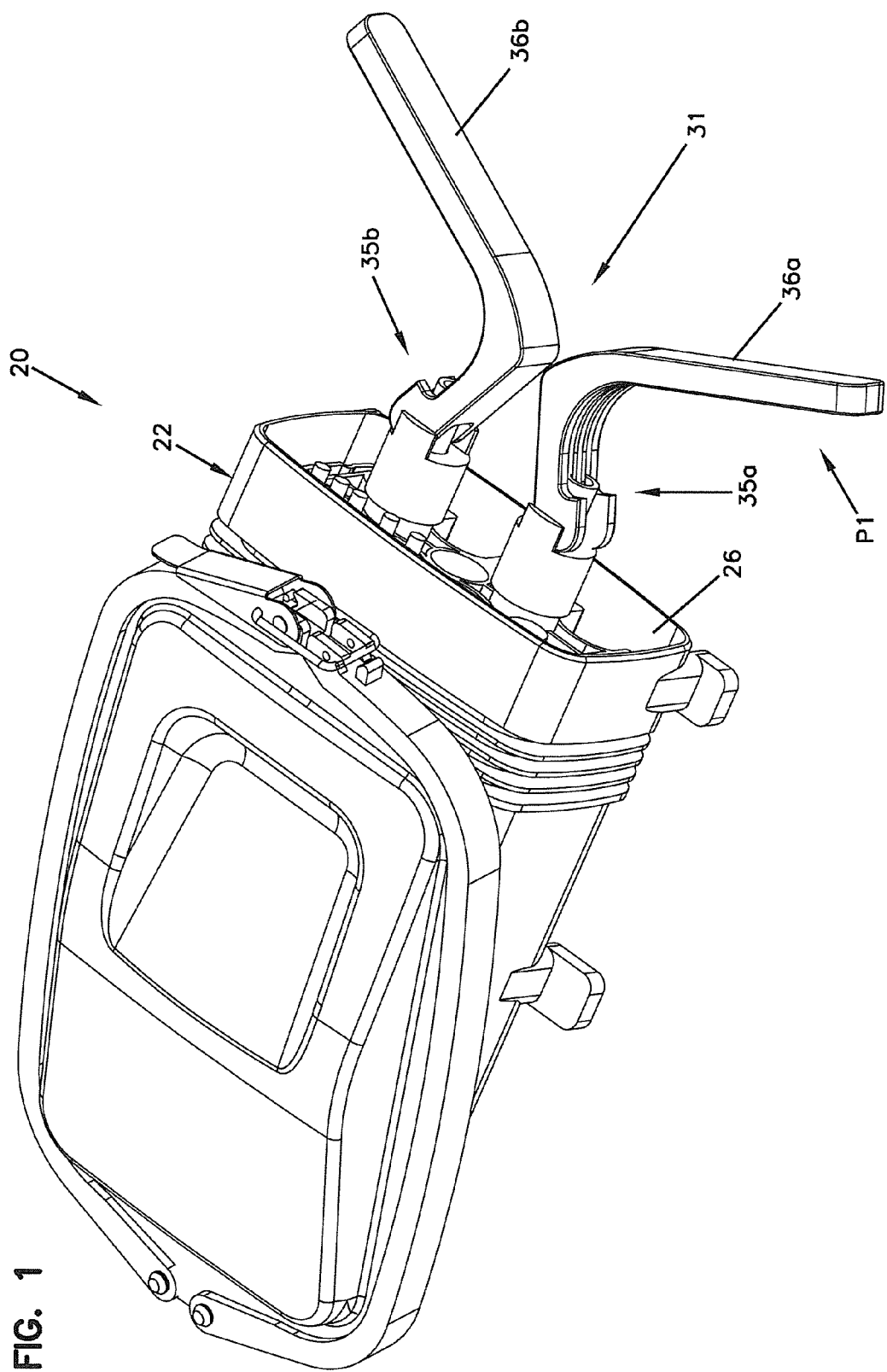
FIG. 1 is a perspective view of a telecommunications enclosure in accordance with the principles of the present disclosure, an actuation arrangement of a sealing unit of the enclosure is shown in a non-actuated position.
Figure 2:
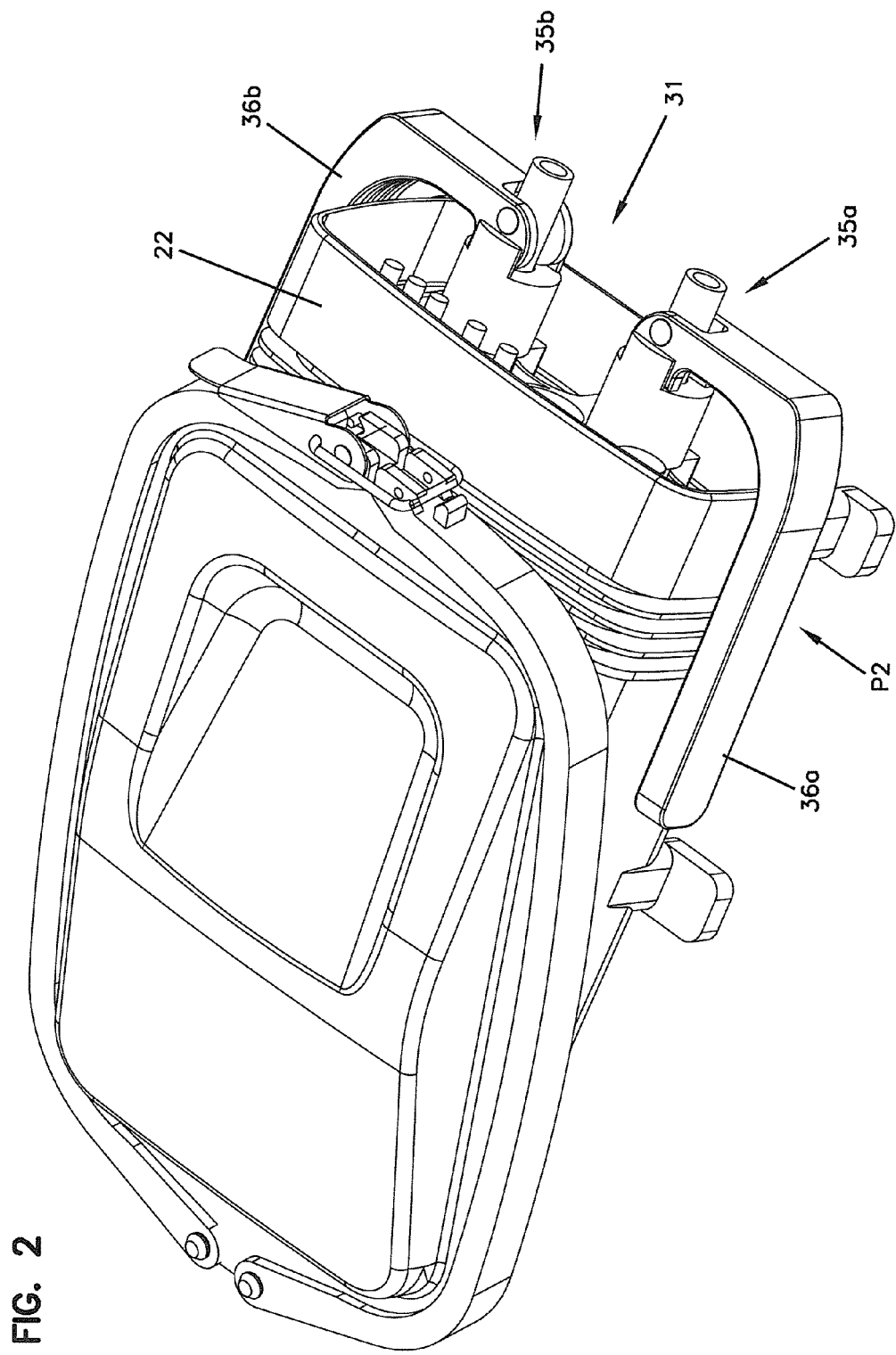
FIG. 2 shows the telecommunications enclosure of FIG. 1 with the actuation arrangement in an actuated position.
Figure 3:
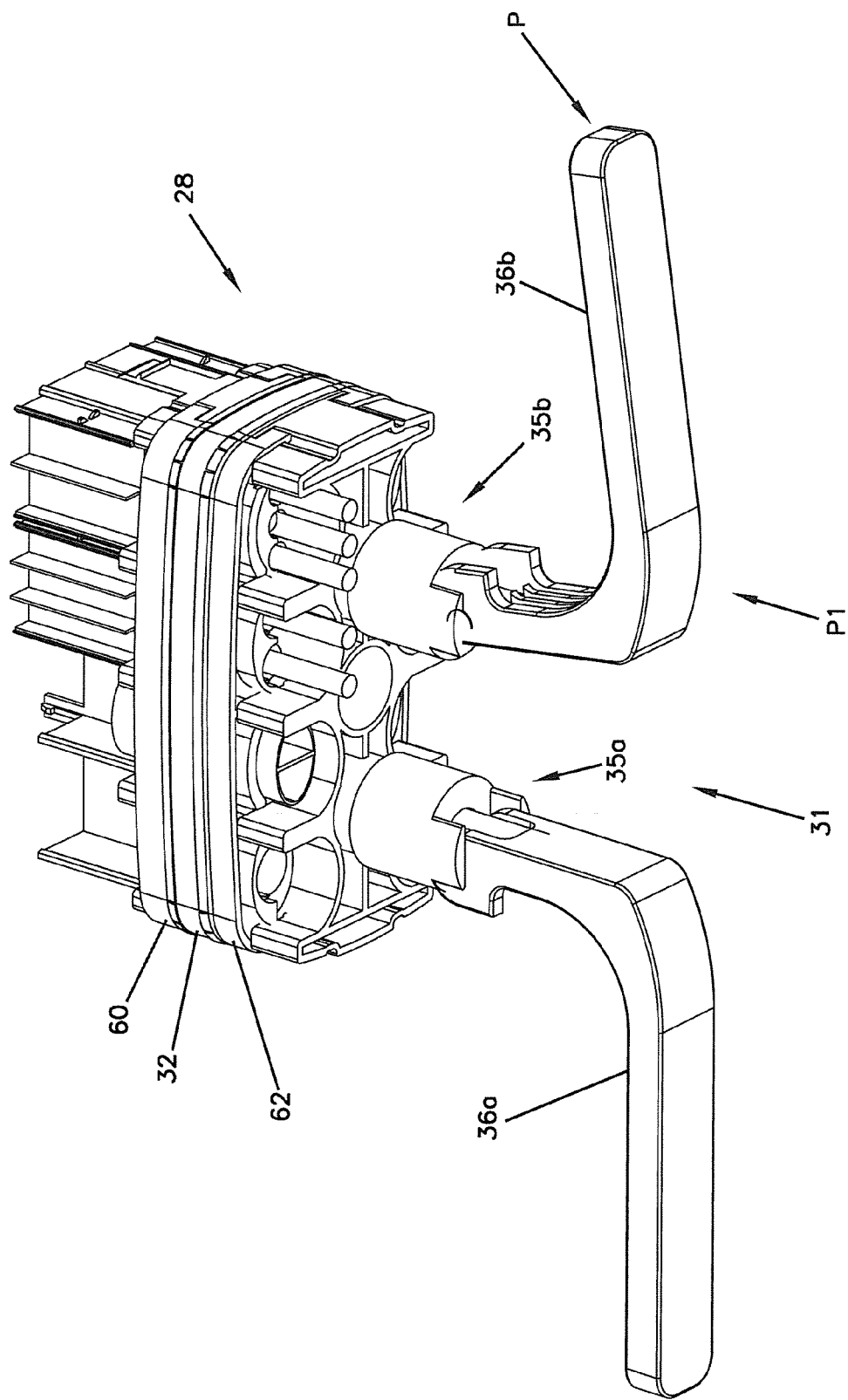
FIG. 3 shows the sealing unit of the enclosure of FIG. 1 isolated from the remainder of the enclosure, the actuation arrangement of the sealing unit is shown in the non-actuated position.
Figure 4:
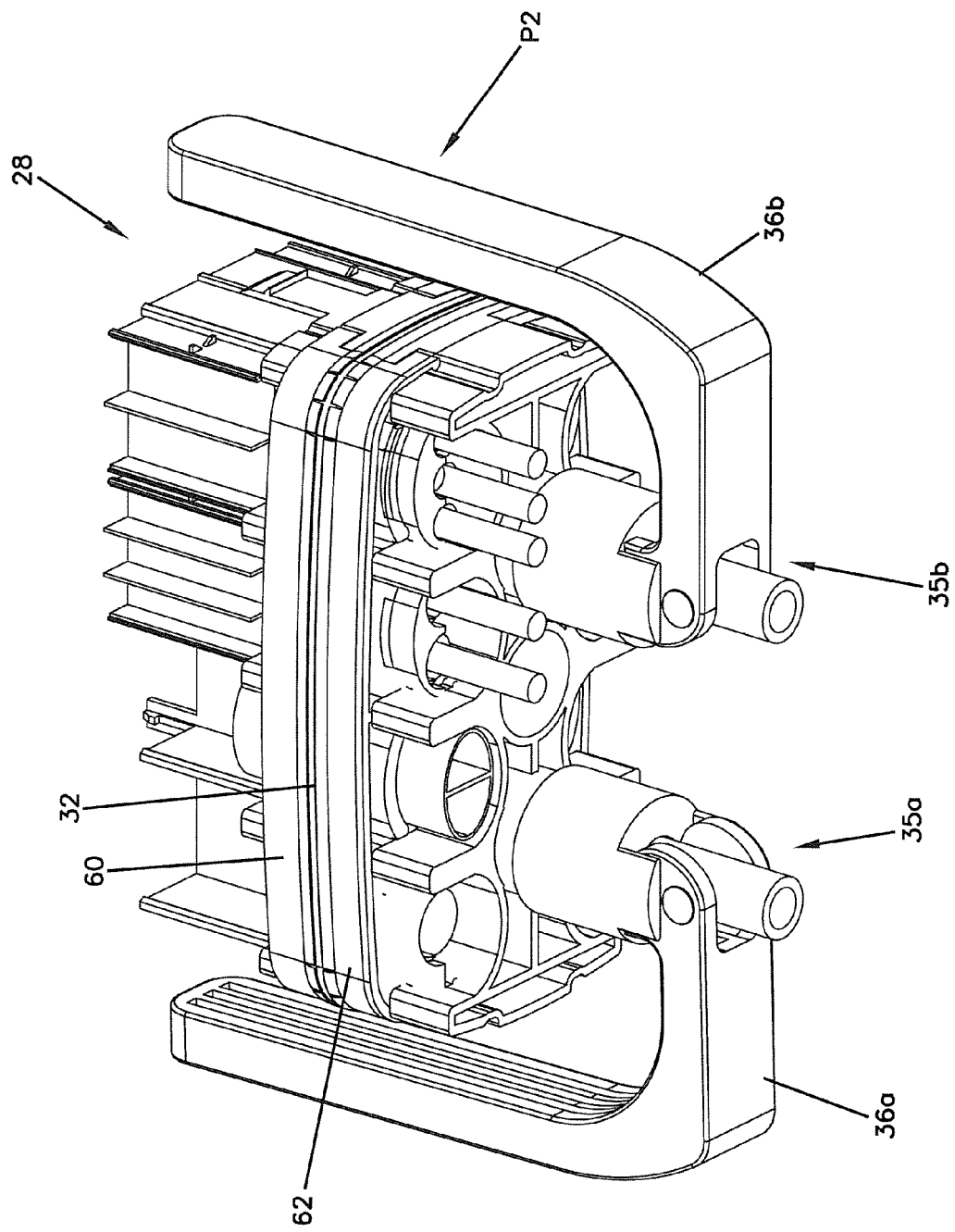
FIG. 4 shows the sealing unit of FIG. 3 with the actuation arrangement in the actuated position.
Figure 5:
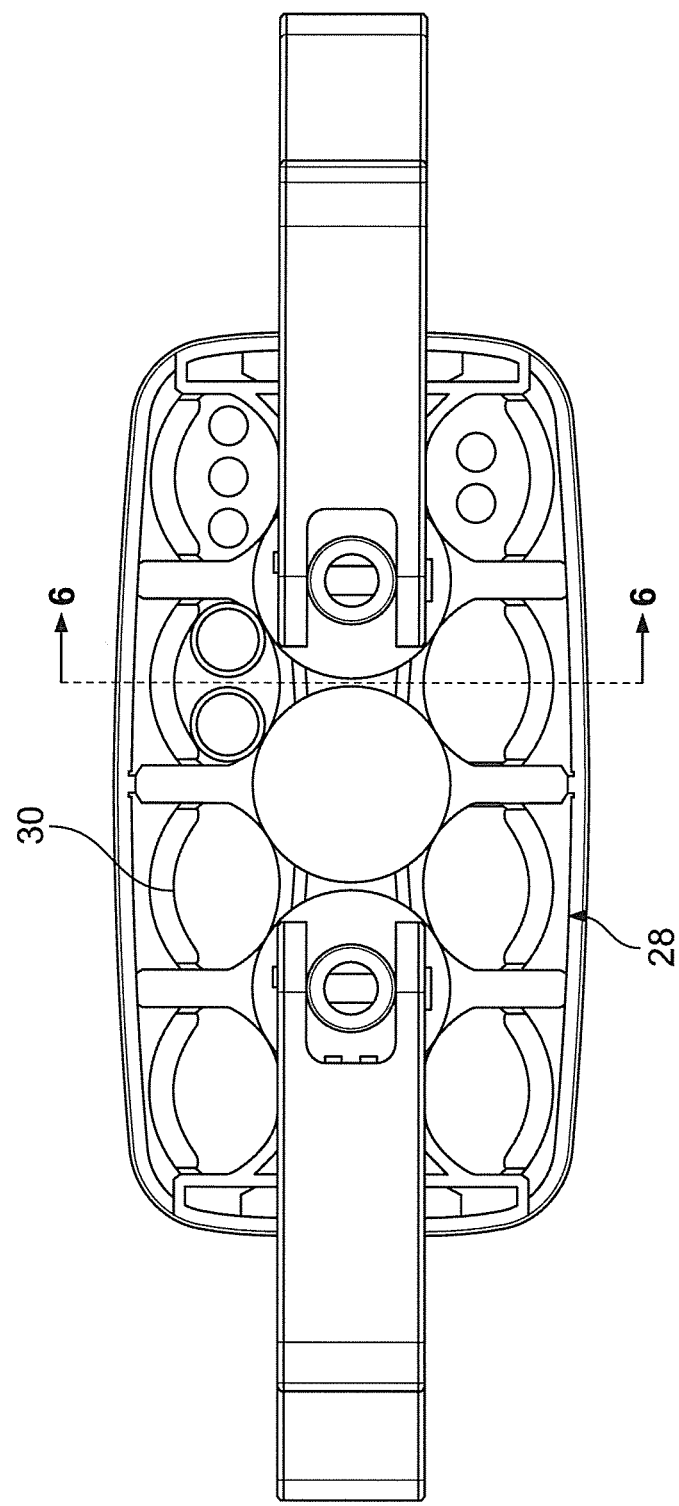
FIG. 5 is an end view of the sealing unit of FIGS. 3 and 4.

FIGS. 1-8 show a telecommunications enclosure 20 in accordance with the principles of the present disclosure. The enclosure 20 includes a housing 22 having an end 24 defining a sealing unit opening 26. The enclosure 20 also includes a sealing unit 28 that fits within the sealing unit opening 26. The sealing unit 28 includes a main sealant arrangement 32 (see FIG. 8) defining a plurality of main cable ports 30. When pressurized, the sealant arrangement 32 is configured for providing seals about structures (e.g., cables, plugs, etc.) routed though the main cable ports 30 and is also configured for providing a peripheral seal between the housing 22 and the cable sealing unit 28. The enclosure 20 further includes an actuation arrangement 31 for pressurizing the main sealant arrangement 32 within the sealing unit opening 26. The actuation arrangement 31 is shown including first and second actuators 35a, 35b that respectively include first and second lever arms 36a, 36b. The actuators 35a, 35b are movable between non-actuated positions P1 (see FIGS. 1 and 3) and actuated positions P2 (see FIGS. 2 and 4). The main sealant arrangement 32 is pressurized as the first and second actuators 35a, 35b are moved from the non-actuated position P1 toward the actuated position P2. In other embodiments, actuation arrangements having only one actuator can be used. Also, in other embodiments, actuation arrangements having alternative types of actuators (e.g., threaded, screw type actuators) can be used.

Figure 6:
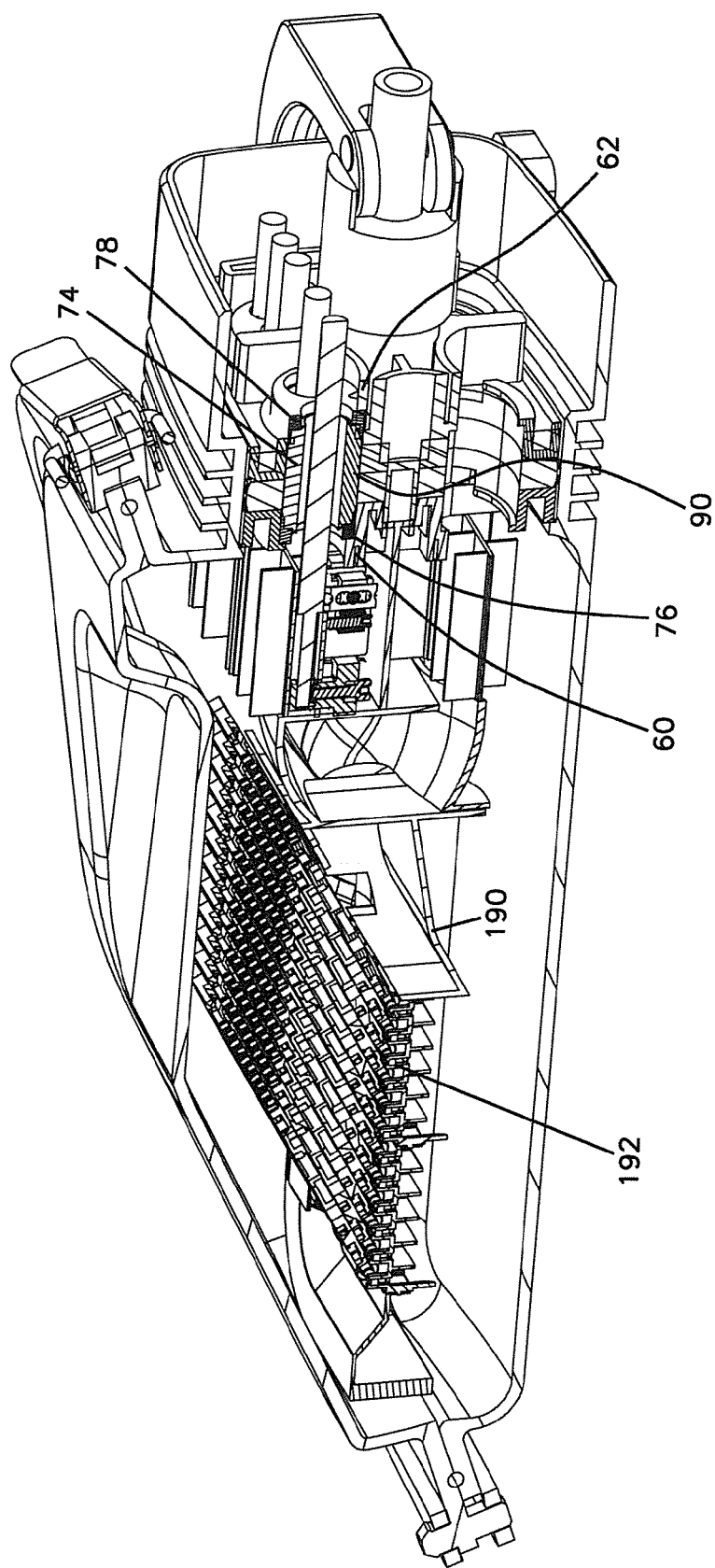
FIG. 6 is a cross-sectional view taken along section line 6-6 of FIG. 5.
Figure 6A:
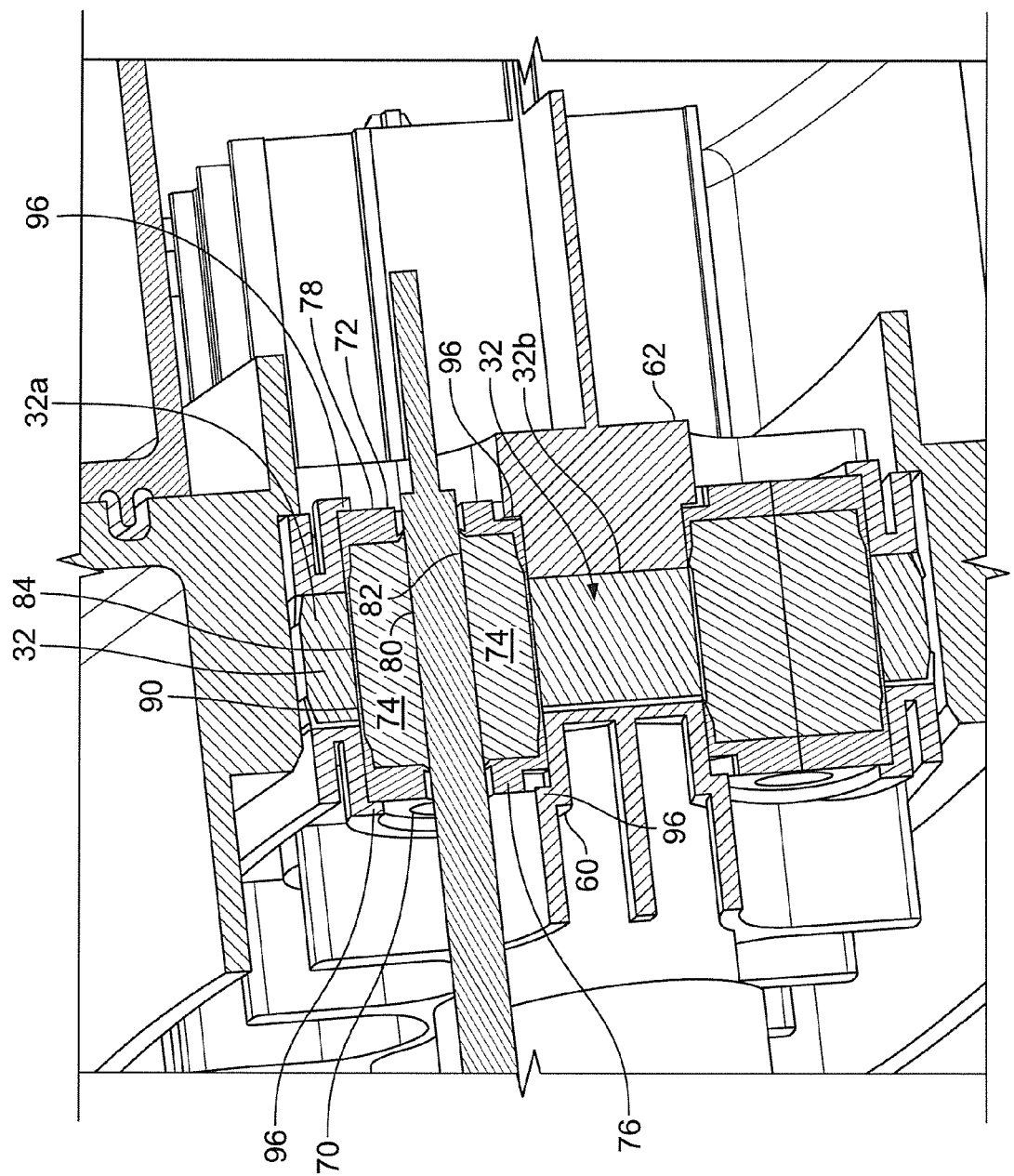
FIG. 6A is a detailed view of a portion of FIG. 6.
Figure 7:
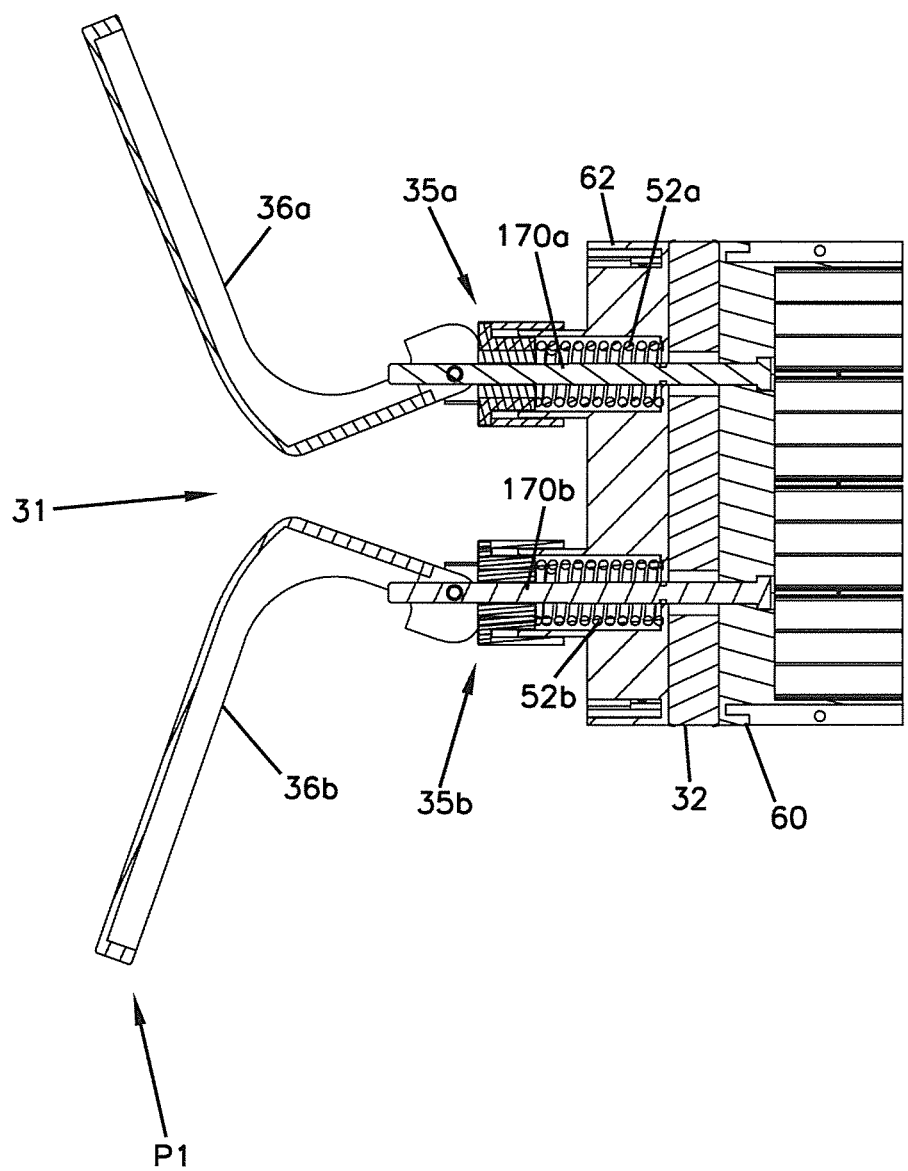
FIG. 7 is a cross-sectional view taken along section line 7-7 of FIG. 5.

Referring to FIG. 7, the actuation arrangement 31 includes inner and outer pressurization structures 60, 62 (e.g., plates, members, bodies, etc.). As shown at FIG. 6, a frame 190 supporting a plurality of optical components 192 (e.g., splice trays, splitter trays, etc.) is attached to the inner pressurization structure 60 and carried with the sealing unit 28. The main sealant arrangement 32 is positioned between the inner and outer pressurization structures 60, 62. The actuators 35a, 35b include springs 52a, 52b corresponding to each of the first and second lever arms 36a, 36b for transferring seal pressurization forces from the first and second lever arms 36a, 36b to the sealant arrangement 32. When the first and second lever arms 36a, 36b are moved toward the actuated positions P2, the first and second lever arms 36a, 36b generate first and second seal pressurization forces that press the sealant arrangement 32 between the first and second pressurization structures 60, 62. More specifically, pressurization forces from the first and second lever arms 36a, 36b are transferred from lever cam surfaces 64a, 64b through the springs 52a, 52b and through shafts 170a, 170b to the inner and outer pressurization structures 60, 62. In this way, the first and second pressurization plates 60, 62 are spring biased toward one another such that spring pressure is applied to the sealant arrangement 32 for pressurizing the sealant arrangement 32 to maintain the seals over an extended period of time.

Figure 8:
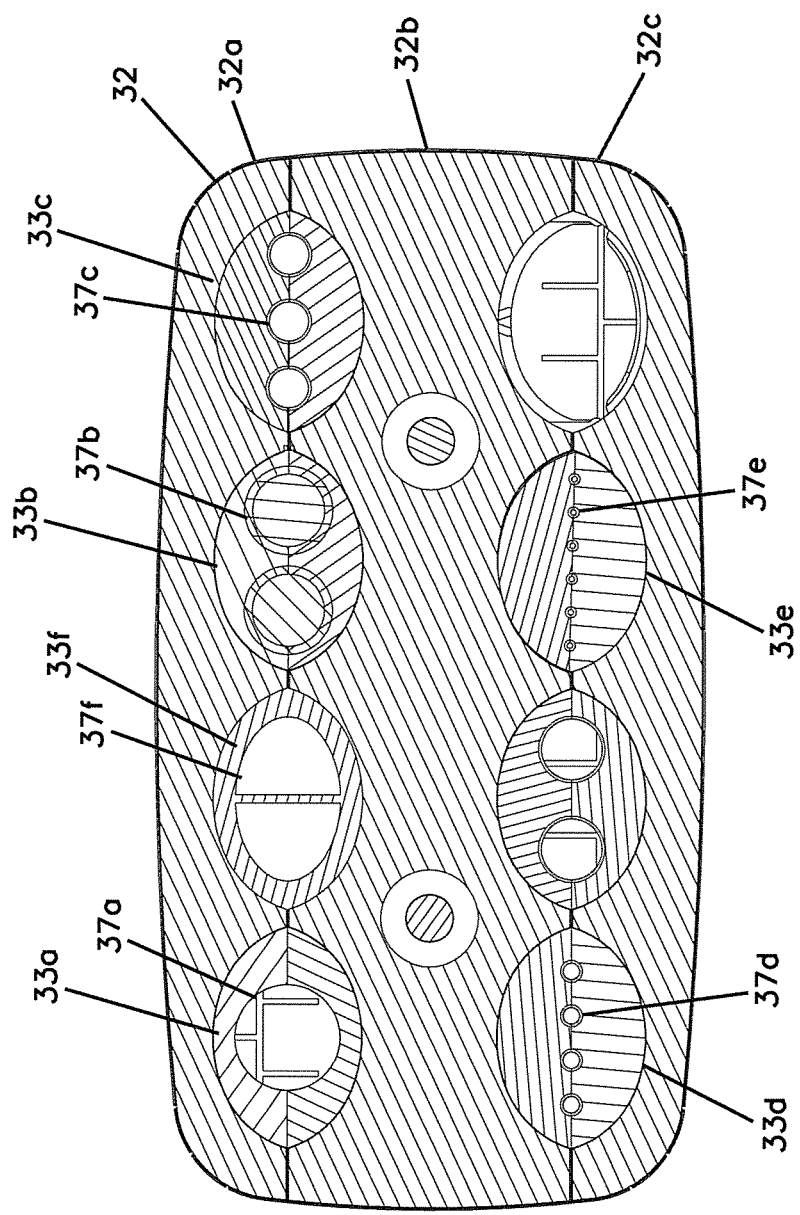
FIG. 8 is a cross-sectional view taken along section line 8-8 of FIG. 4.

Referring to FIG. 8, the main sealant arrangement 32 includes multiple portions of sealant (e.g., gel blocks) that cooperate to form a collective volume of sealant that is pressurized by the actuation arrangement 31. For example, the main sealant arrangement 32 includes sealant portions 32a, 32b and 32c that cooperate to define the main cable ports 30. Sealant portion 32a is shown as an upper sealant block, sealant portion 32c is shown as a lower sealant block, and sealant portion 32b is shown as an intermediate sealant block. In certain embodiments, the sealant portions 32a, 32b and 32c are constructed of a sealing gel. The main cable ports 30 are sized to receive and seal relatively large telecommunication cables. When the actuation arrangement 31 is actuated, the main sealant arrangement 32 is axially pressurized between the inner and outer pressurization structures 60, 62. As the main sealant arrangement 32 is pressurized, the sealant arrangement 32 flows/deforms to fill voids within the sealing unit opening 26, to form the peripheral seal with the housing 22, and to form seals around any cables or inserts positioned within the main cable ports 30.

Aspects of the present disclosure relate to techniques for allowing the main sealing arrangement to be readily reconfigured to accommodate cables of different sizes, cross-sectional shapes/profiles and numbers. For example, to allow the main cable ports 30 to accommodate smaller cables, cable port size reducing structures such as cable port size reducing inserts can be inserted in one or more of the main cable ports 30. The cable port size reducing inserts can be mounted within the main cable ports 30 and captured axially between the first and second pressurization structures 60, 62. The cable port sized reducers can each define at least one reduced size cable port having a smaller dimension (e.g., diameter) that the corresponding main cable ports 30 in which the cable port size reducers are mounted. In certain embodiments, the cable port size reducers can each define multiple cable ports of reduced size. In certain embodiments, the cable port size reducers can define reduced size cable ports having different shapes/profiles such as round openings, elongated openings (e.g., for flat drop cables) or other shaped openings. Referring to FIG. 8, cable port size reducing structures in the form of cable port size reducing inserts 33a, 33b, 33c, 33d, 33e and 33f are shown mounted within selected main cable ports 30. The cable port size reducing insert 33a defines one reduced size cable port 37a that is reduced in size as compared to the main cable ports 30. The cable port size reducing insert 33b defines two reduced size cable ports 37b that are reduced in size as compared to the main cable ports 30. The cable port size reducing insert 33c defines three reduced size cable ports 37c that are reduced in size as compared to the main cable ports 30. The cable port size reducing insert 33d defines four reduced size cable ports 37d that are reduced in size as compared to the main cable ports 30. The cable port size reducing insert 33e defines six reduced size cable ports 37e that are reduced in size as compared to the main cable ports 30. The insert 33f is a removeable plug used to block an unused port. In addition to the inserts specifically depicted, it will be appreciated that inserts having different numbers of cable opening, different shapes of cable openings, and different sizes of cable openings can also be used to accommodate different cable types.

Figure 10:
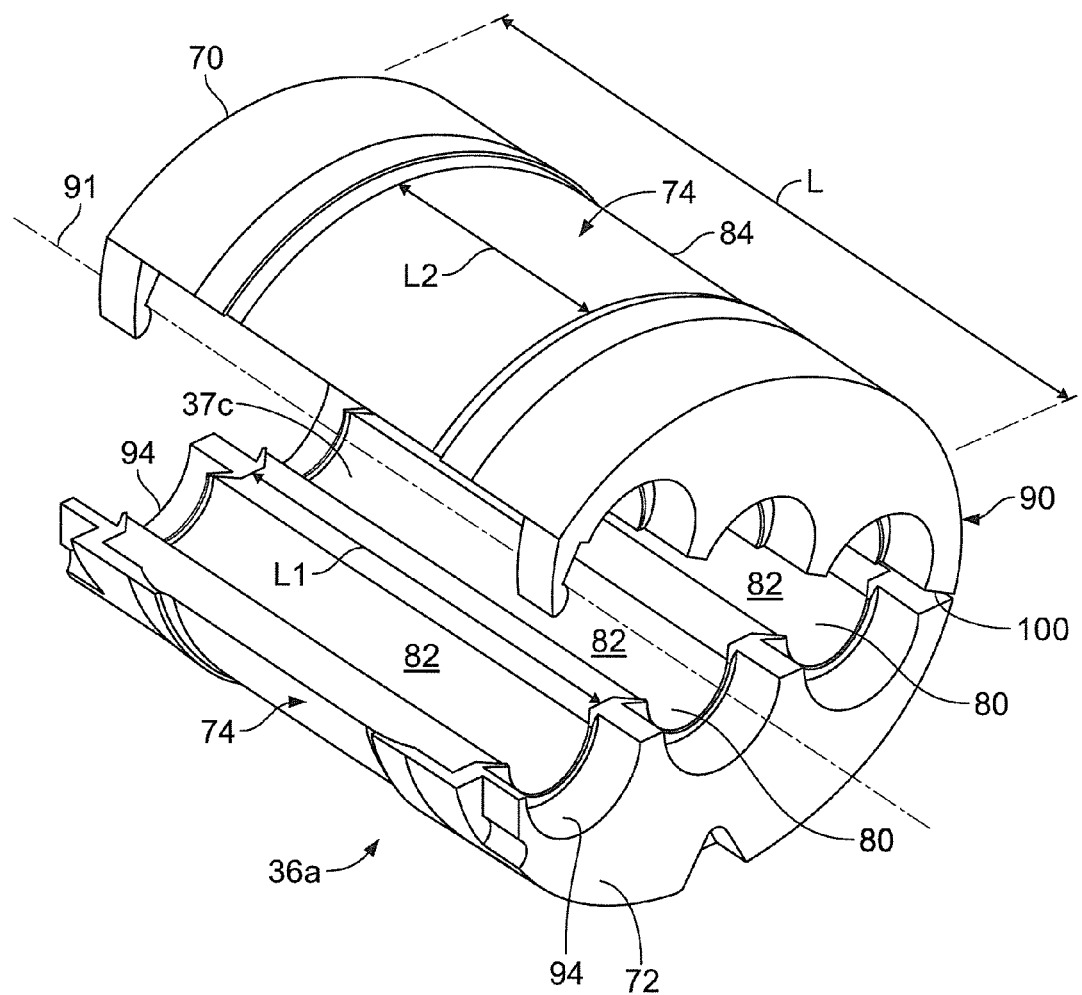
FIG. 10 shows the cable port size reducing insert of FIG. 9 in a partially open position.

Referring to FIGS. 9-11, the cable port size reducing insert 33c is depicted. It will be appreciated that other than the size, shape and number of reduced size cable ports provided, the cable port size reducing inserts 33a-33f can have similar constructions. Thus, the description pertaining to the cable port size reducing inert 33c is applicable to the other cable port size reducing inserts 33a, 33b and 33d-33f as well.

Referring to FIG. 10, the cable port size reducing insert 33c includes an insert body 90 having a total axial length L1 that extends between first and second axial ends 70, 72 of the insert body 90 along a central insert axis 91. The insert body 90 has a composite construction including a volume of sealant 74 at least partially contained axially between first and second axial containment layers 76, 78. The first and second axial containment layers 76, 78 are respectively positioned adjacent the first and second ends 70, 72 of the insert body 90 and form axial end caps of the insert body 90. The first and second axial containment layers 76, 78 are attached (e.g., bonded) to ends of the volume of sealant 74. The first and second axial containment layers 76, 78 are preferably constructed of a material that has a higher hardness and is less flowable than the sealant material constituting the volume of sealant 74. Thus, when the volume of sealant 74 is pressurized to provide cable sealing, the first and second axial containment layers 76, 78 assist in containing the volume of sealant 74 between the axial ends 70, 72 to limit the amount of volume of sealant 74 that is forced out of the sealing unit 28. The volume of sealant 74 and the main sealant arrangement 32 are in fluid communication with one another and are pressurized between the first and second pressurization structures 60, 62 when the actuation arrangement 31 is actuated.

The harder material of the containment layer 76, 78 does not extend the total axial length L of the insert body 90. Instead, only the volume of sealant 74 of the insert body 90 is located between the containment layers 76, 78. Thus, the containment layers 76, 78 are carried with the volume of sealant 74 and the containment layers 76, 78 can move axially relative to one another as the volume of sealant 74 is axially compressed. For example, the containment layers 76, 78 can be moved axially with the first and second pressurization structures 60, 62 to assist in providing axial pressurization of the volume of sealant 74 when the actuation arrangement 31 is actuated. In certain embodiments, the insert body 90 does not have any axial reinforcing structure that extends across the volume of sealant 74 and that interconnects containment layers 76, 78 Instead, the containment layers are connected together only by the volume of sealant 74.

The insert body 90 defines a plurality of reduced sized cable ports 37c that extend axially through the volume of sealant 74. The volume of sealant 74 includes cable sealing surfaces 80 that define the reduced sized cable ports 37c. Cable sealing surfaces 80 each have a first axial length L1 that extends axially between the first and second axial containment layers 76, 78. The volume of sealant 74 also includes an exposed outer sealing surface 84 that surrounds a periphery of the insert body 90 and that extends around the central insert axis 91. The outer sealing surface 84 has a second axial length L2 that extends axially between the first and second containment layers 76, 78. The first axial length L1 is longer than the second axial length L2 to provide effective sealing about cables routed through the cable ports 37c. The first and second containment layers 76, 78 define openings 94 that align with the cable ports 37c.

When the insert body 90 is inserted within one of the main cable ports 30 as shown as FIG. 6, the exposed outer sealing surface 84 contacts the main sealant arrangement 32 to form a continuous seal around the periphery of the insert body 90. For example, the outer sealing surface 84 is shown in contact with the upper sealant portion 32a and the intermediate sealant portion 32b of the main sealant arrangement 32. The sealant-to-sealant contact allows the outer sealing surface 84 to provide an effective seal even though the second axial length L2 is relatively short. Actuation of the actuation arrangement 31 causes both the main sealant arrangement 32 and the volume of sealant 74 to be pressurized. In certain embodiments, the first and second containment layers 76, 78 of the insert 36 interface with the pressurization structures 60, 62 such that the pressurization structures 60, 62 apply pressure axially through the first and second axial containment layers 76, 78 to the volume of sealant 74 when the actuation arrangement 31 is actuated. In certain embodiments, portions 96 (e.g., tabs, lips, flanges, etc.) of the pressurization structures 60, 62 overlap the first and second containment layers 76, 78 such that the insert body 90 is captured axially between the pressurization structures. In certain embodiments, the pressurization structures 60, 62 mate, interlock or otherwise connect with the containment layers 76, 78. For example, projections of the pressurization structures 60, 62 can fit within receptacles defined by the containment layers 76, 78.

Referring back to FIGS. 9-11, the insert body 90 is depicted as rounded plug and the outer sealing surface 84 forms an outer rounded sealing band between the first and second containment layers 76, 78. In certain embodiments, the insert body 90 has a wrap-around configuration for allowing a reduced sized cable to be laterally inserted into the reduced sized cable port 37c. As shown at FIG. 9, the wrap-around configuration is provided by an axial hinge line 100 which allows the insert body 90 to be moved from a closed position (see FIG. 9), through an intermediate position (see FIG. 10) to an open configuration (see FIG. 11). To move the insert body 90 between the open and closed configurations, portions of the insert body 90 (e.g., half-pieces 90a, 90b) of the insert body 90 are pivoted apart from one another about the axial hinge line 100. In certain embodiments, latches 102 can be positioned on an opposite side of the insert body 90 from the hinge line 100 for retaining the insert body 90 in the closed position. The latches 102 can be coupled to the axial containment layers 76, 78. For example, in certain embodiments, the containment layers 76, 78 can be plastic and the latches 102 can be integrally formed with containment layers 76, 78 using a plastic molding process.

To load a cable in the insert body 90, the insert body 90 is opened and the cable is laterally inserted into one of the openings 37c. Plugs can be inserted into unused openings 37c. After loading the cable into the insert body 90, the inset body can be inserted into one of the main cable ports 30 of the main sealant arrangement 32. To insert an insert body 90 in one of the main cable ports 30, the sealing unit 28 is de-actuated and removed from the housing 22. With the actuation arrangement 31 de-actuated and the sealing unit 28 removed from the housing 26, the top or bottom portions of sealant 32a, 32c can be removed from between the pressurization structures 60, 62 thereby allowing the insert body 90 with the cable pre-loaded therein to be inserted laterally into a desired one of the main cable ports 30. After the insert body 90 has been inserted into the main cable port 30, the portions of sealant 32a or 32b can be reinstalled between the pressurization structures 60, 62. Thereafter, the sealing unit can be inserted into the opening 26 of the housing 22 and the actuation arrangement 31 can be actuated to pressurize the main sealant arrangement 32 and the volumes of sealant 74 correspond to any insert body 90 mounted within any of the main cable ports 30. Upon actuation, the pressurization structures 60, 62 move axially together into engagement with the containment layer 76, 78 of the insert body 90.

It will be appreciated that various materials can be used to form the sealant arrangement. Example materials include elastomers, including natural or synthetic rubbers (e.g., EPDM rubber or silicone rubber). In other embodiments, polymeric foam (e.g., open cell or closed cell) such as silicone foam can be used. In still other embodiments, the sealing members may comprise gel and/or gel combined with another material such as an elastomer. The gel may, for example, comprise silicone gel, urea gel, urethane gel, thermoplastic gel, or any suitable gel or geloid sealing material. Gels are normally substantially incompressible when placed under a compressive force and normally flow and conform to their surroundings thereby forming sealed contact with other surfaces. Example gels include oil-extended polymers. The polymer may, for example, comprise an elastomer, or a block copolymer having relatively hard blocks and relatively elastomeric blocks. Example copolymers include styrene-butadiene or styrene-isoprene di-block or tri-block copolymers. In still other embodiments, the polymer of the gel may include one or more styrene-ethylene-propylene-styrene block copolymers. Example extender oils used in example gels may, for example, be hydrocarbon oils (e.g., paraffinic or naphthenic oils or polypropene oils, or mixtures thereof). The sealing members can also include additives such as moisture scavengers, antioxidants, tackifiers, pigments and/or fungicides. In certain embodiments, sealing members in accordance with the principles of the present disclosure have ultimate elongations greater than 100 percent with substantially elastic deformation to an elongation of at least 100 percent. In other embodiments, sealing members in accordance with the principles of the present disclosure have ultimate elongations of at least 200 percent, or at least 500 percent, or at least 1000 percent. Ultimate elongation can be determined by the testing protocol set forth at ASTM D412.

LIST OF REFERENCE NUMERALS AND CORRESPONDING FEATURES 20 enclosure
22 housing
24 end
26 sealing unit opening
28 sealing unit
30 main cable ports
31 actuation arrangement
32 sealant arrangement
32a, 32b, 32c sealant portions
33a, 33b, 33c cable port size reducing inserts
33d, 33e, 33f cable port size reducing inserts
35a, 35b actuators
36a, 36b first and second lever arms
37a, 37b, 37c reduced-size cable ports
37d, 37e, 37f reduced-size cable ports
52a, 52b springs
60 inner pressurization structure
62 outer pressurization structure
64a, 64b first and second cam surfaces
70 axial end
72 axial end
74 sealant
76 axial containment layer
78 axial containment layers.
80 cable sealing surfaces
84 outer sealing surface
90 insert body
91 central insert axis
94 openings
96 portions
100 axial hinge line
102 latches
170a, 170b shafts
190 frame
192 optical components
P1 non-actuated positions
P2 actuated positions
L1 total axial length
L2 second axial length

The invention claimed is:

1. A cable sealing module comprising:
a module body having a total axial length that extends between first and second ends of the module body, the module body defining a central axis that extends along the total axial length, the module body having a composite construction including a volume of sealant at least partially contained between first and second axial containment layers, the first and second axial containment layers forming first and second axial end caps attached to the volume of sealant adjacent the first and second ends of the insert body, the module body defining at least three cable ports that extends axially through volume of sealant, the volume of sealant including cable sealing surfaces that extends around the cable ports, the volume of sealant also including an exposed outer sealing surface that surrounds a periphery of the module body and extends around the central axis of the module body, the exposed outer sealing surface and the cable sealing surfaces being positioned between the first and second axial end caps;
the module body having a wrap-around configuration for allowing cables to be laterally inserted into the cable ports, the wrap-around configuration including a hinge line defined by a flexible hinge for allowing first and second segments of the module body to be pivoted apart from one another about the hinge line, the at least three cable ports being defined at an interface between the first and second segments that opens when the first and second segments of the module body are pivoted apart from one another, each of the first and second segments of the module including a portion of the volume of sealant, a portion of the first axial end cap and a portion of the second axial end cap.

2. The cable sealing module of claim 1, wherein the first and second segments of the module body form half-sections of the module body.

3. The cable sealing module of claim 1, wherein the axial end caps include latches positioned opposite the hinge line for retaining the cable sealing module in a closed position.

4. The cable sealing module of claim 1, wherein only the volume of sealant of the module body extends between the first and second axial end caps.

5. The cable sealing module of claim 1, wherein the cable sealing surfaces have first axial lengths that extends between the first and second axial end caps, wherein the outer sealing surface has a second axial length that extends between the first and second axial end caps, and wherein the first axial lengths are longer than the second axial length.

6. The cable sealing module of claim 1, wherein the first and second axial end caps each define at least three opening that align with the at least three cable ports that extend through the volume of sealant.

7. A sealing module adapted to be inserted into a sealing block, the sealing module comprising:
a first body piece; and
a second body piece hingeably connected to the first body piece;
the first and second body pieces defining a mating interface where the first and second body pieces meet, the first and second body pieces further defining therebetween at least three cable ports at the mating interface, the first and second body pieces also defining a row of three openings that respectively align with the at least three cable ports;
the sealing module having a total axial length that extends between first and second ends of the sealing module, the first and second body pieces defining a central axis that extends along the total axial length, and the at least three cable ports extending parallel with the central axis; and
the sealing module having a composite construction including a volume of sealant at least partially contained between first and second axial containment layers, the first and second axial containment layers forming first and second axial end caps attached to the volume of sealant adjacent the first and second ends of the sealing module.

8. The sealing module according to claim 7, wherein the sealing module defines a reduced size cable port that extends axially through the volume of sealant, the volume of sealant including a cable sealing surface that extends around the reduced size cable port, the volume of sealant also including an exposed outer sealing surface that surrounds a periphery of the sealing module and extends around the central axis of the sealing module, the exposed outer sealing surface and the cable sealing surface being positioned between the first and second axial end caps.

9. The sealing module according to claim 7, wherein the entire sealing module has a single flexible hinge, the sealing module being movable to an open configuration in which the first and second body pieces are pivoted apart from one another about the flexible hinge.

10. The sealing module according to claim 7, further comprising an actuation arrangement for pressurizing the sealing block, the actuation arrangement including first and second pressurization structures between which the sealing block is positioned, the actuation arrangement also including first and second actuators each movable between a non-actuated position and an actuated position.

11. The sealing module according to claim 10, wherein the first actuator includes a first lever arm for moving the first actuator between the non-actuated and actuated positions, and the second actuator includes a second lever arm for moving the second actuator between the non-actuated and actuated positions.

12. The sealing module according to claim 10, wherein the first actuator includes a first spring and the second actuator includes a second spring, wherein when the first and second actuators are moved towards the actuated positions, the first and second actuators generate first and second seal pressurization forces that press the sealing block between the first and second pressurization structures.

13. The sealing module according to claim 12, wherein the first and second seal pressurization forces are transferred through the first and second springs.

14. The sealing module according to claim 8, wherein the sealing module has a wrap-around configuration for allowing a reduced sized cable to be laterally inserted into the reduced size cable port.

15. The sealing module according to claim 9, wherein the first and second axial end caps include latches positioned opposite the flexible hinge for retaining the sealing module in a closed position.

16. The sealing module according to claim 10, wherein the first and second axial end caps are configured to interlock with the first and second pressurization structures of the actuation arrangement.

17. The sealing module according to claim 10, wherein the first and second axial end caps are configured to mate with the first and second pressurization structures of the actuation arrangement.

18. The sealing module according to claim 10, wherein the first and second axial end caps define receptacles for receiving corresponding projections provided on the first and second pressurization structures of the actuation arrangement.

* * * * *